United States Patent
Harris

(10) Patent No.: US 10,325,266 B2
(45) Date of Patent: Jun. 18, 2019

(54) REWARDING CLASSES OF PURCHASERS

(75) Inventor: Adam Harris, San Diego, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 1638 days.

(21) Appl. No.: 12/473,668

(22) Filed: May 28, 2009

(65) Prior Publication Data

US 2010/0306038 A1    Dec. 2, 2010

(51) Int. Cl.
*G06Q 30/02* (2012.01)
*G06Q 30/00* (2012.01)

(52) U.S. Cl.
CPC .......... *G06Q 30/00* (2013.01); *G06Q 30/0207* (2013.01)

(58) Field of Classification Search
None
See application file for complete search history.

(56) References Cited

U.S. PATENT DOCUMENTS

| | | |
|---|---|---|
| 5,222,134 A | 6/1993 | Waite et al. |
| 5,233,423 A | 8/1993 | Jernigan et al. |
| 5,490,216 A | 2/1996 | Richardson, III |
| 5,523,551 A | 6/1996 | Scott |
| 5,532,735 A | 7/1996 | Blahut et al. |
| 5,629,980 A | 5/1997 | Stefik et al. |
| 5,636,277 A | 6/1997 | Nagahama |
| 5,794,217 A | 8/1998 | Allen |
| 5,809,145 A | 9/1998 | Silk et al. |

(Continued)

FOREIGN PATENT DOCUMENTS

| | | |
|---|---|---|
| EP | 0 773 490 A1 | 5/1997 |
| EP | 0 795 809 | 9/1997 |

(Continued)

OTHER PUBLICATIONS

Alice Atkinson-Bonasio, Video Game Tips: How to use save points effectively published Oct. 12, 2008, www.Helium.com http://www.helium.com/items/1205745-save-feature-and-the-gaming-community pp. 1-3 retrieved Jul. 19, 2011. document titled save points on Heliump1-3.pdf.*

(Continued)

*Primary Examiner* — Patricia H Munson
(74) *Attorney, Agent, or Firm* — Polsinelli LLP

(57) ABSTRACT

Rewarding a first classification of purchasers of digital media is provided. Such a classification may include initial purchasers (e.g., purchasers of new items) and secondary purchasers (e.g., purchasers of previously used items). A digital medium is played on a digital device and a notification is sent to a server. The server identifies the user of the digital device based on a unique device identifier associated with the digital device and a stored association of that digital device with the user. The user is determined to belong to the first classification of purchasers of the digital medium based on a unique identifier associated with the digital medium. The user, belonging to the first classification of purchasers, is provided with access to a reward that is not generally accessible to users belonging to a second classification. Users that are identified as belonging to the second classification may be offered a chance to upgrade their classification and access the reward.

21 Claims, 3 Drawing Sheets

(56) References Cited

U.S. PATENT DOCUMENTS

| | | | |
|---|---|---|---|
| 5,838,314 A | 11/1998 | Neel et al. |
| 5,845,265 A | 12/1998 | Woolston |
| 5,892,900 A | 4/1999 | Ginter et al. |
| 5,913,040 A | 6/1999 | Rakavy et al. |
| 6,066,182 A | 5/2000 | Wilde et al. |
| 6,070,141 A | 5/2000 | Houvener et al. |
| 6,073,123 A | 6/2000 | Staley |
| 6,081,785 A | 6/2000 | Oshima et al. |
| 6,085,176 A | 7/2000 | Woolston |
| 6,085,262 A | 7/2000 | Sawada |
| 6,117,011 A | 9/2000 | Lvov |
| 6,119,108 A | 9/2000 | Holmes et al. |
| 6,135,646 A | 10/2000 | Kahn et al. |
| 6,137,480 A | 10/2000 | Shintani |
| 6,148,335 A | 11/2000 | Haggard et al. |
| 6,189,146 B1 | 2/2001 | Misra et al. |
| 6,195,432 B1 | 2/2001 | Takahashi et al. |
| 6,201,771 B1 | 3/2001 | Otsuka et al. |
| 6,202,051 B1 | 3/2001 | Woolston |
| 6,243,796 B1 | 6/2001 | Otsuka |
| 6,247,131 B1 | 6/2001 | Kotani et al. |
| 6,260,141 B1 | 7/2001 | Park |
| 6,266,651 B1 | 7/2001 | Woolston |
| 6,311,209 B1 | 10/2001 | Olson et al. |
| 6,314,451 B1 | 11/2001 | Landsman et al. |
| 6,405,203 B1 | 6/2002 | Collart |
| 6,434,535 B1 | 8/2002 | Kupka et al. |
| 6,446,260 B1 | 9/2002 | Wilde et al. |
| 6,463,078 B1 | 10/2002 | Engstrom et al. |
| 6,470,085 B1 | 10/2002 | Uranaka et al. |
| 6,529,453 B1 | 3/2003 | Otsuka et al. |
| 6,560,640 B2 | 5/2003 | Smethers |
| 6,594,740 B1 | 7/2003 | Fukuda |
| 6,611,607 B1 | 8/2003 | Davis et al. |
| 6,633,849 B1 | 10/2003 | Dodd |
| 6,640,306 B1 | 10/2003 | Tone et al. |
| 6,655,580 B1 | 12/2003 | Ergo |
| 6,694,025 B1 | 2/2004 | Epstein et al. |
| 6,820,063 B1 | 11/2004 | England et al. |
| 6,832,318 B1 | 12/2004 | Yaegashi et al. |
| 6,920,565 B2 | 7/2005 | Isaacson et al. |
| 7,313,251 B2 | 12/2007 | Rhoads |
| 7,426,750 B2 | 9/2008 | Cooper |
| 7,480,621 B1 | 1/2009 | Megiddo |
| 7,515,733 B2 | 4/2009 | Rhoads |
| 7,571,328 B2 | 8/2009 | Baumert |
| 7,613,633 B1 | 11/2009 | Woolston |
| 7,613,735 B2 | 11/2009 | Yao |
| 7,845,002 B1 | 11/2010 | Boyer et al. |
| 8,073,740 B1 | 12/2011 | Siegel et al. |
| 8,190,519 B1 | 5/2012 | Angilivelil et al. |
| 9,275,197 B2 | 3/2016 | Harris |
| 2001/0007981 A1 | 7/2001 | Woolston |
| 2001/0020295 A1 | 9/2001 | Satoh |
| 2001/0025256 A1 | 9/2001 | Oliphant et al. |
| 2001/0034721 A1 | 10/2001 | Bourdeau et al. |
| 2001/0051996 A1 | 12/2001 | Cooper et al. |
| 2002/0016922 A1 | 2/2002 | Richards et al. |
| 2002/0029252 A1* | 3/2002 | Segan et al. ............ 709/217 |
| 2002/0052816 A1 | 5/2002 | Clenaghan et al. |
| 2002/0077988 A1 | 6/2002 | Sasaki et al. |
| 2002/0082997 A1 | 6/2002 | Kobata et al. |
| 2002/0103855 A1 | 8/2002 | Chatani |
| 2002/0104019 A1 | 8/2002 | Chatani et al. |
| 2002/0116206 A1 | 8/2002 | Chatani |
| 2002/0116275 A1 | 8/2002 | Woolston |
| 2002/0116283 A1 | 8/2002 | Chatani |
| 2002/0129094 A1 | 9/2002 | Reisman |
| 2002/0161709 A1 | 10/2002 | Floyd et al. |
| 2002/0196940 A1 | 12/2002 | Isaacson et al. |
| 2003/0032486 A1 | 2/2003 | Elliott et al. |
| 2004/0133512 A1 | 7/2004 | Woolston |
| 2004/0205028 A1 | 10/2004 | Verosub |
| 2004/0220878 A1 | 11/2004 | Lao et al. |
| 2005/0033655 A1 | 2/2005 | Woolston |
| 2005/0049929 A1 | 3/2005 | Hsu et al. |
| 2005/0204405 A1 | 9/2005 | Wormington |
| 2005/0216548 A1* | 9/2005 | Wormington et al. ....... 709/201 |
| 2005/0261988 A1 | 11/2005 | Horel |
| 2006/0253399 A1 | 11/2006 | Chatani |
| 2007/0088622 A1 | 4/2007 | Floyd |
| 2007/0174385 A1 | 7/2007 | DuFour |
| 2007/0207780 A1* | 9/2007 | McLean ................ 455/414.1 |
| 2007/0271184 A1 | 11/2007 | Niebert |
| 2007/0271188 A1 | 11/2007 | Burkholder |
| 2007/0282850 A1 | 12/2007 | Sachnoff |
| 2008/0082405 A1 | 4/2008 | Martinez |
| 2008/0120196 A1 | 5/2008 | Reed |
| 2008/0126223 A1 | 5/2008 | Chatani |
| 2008/0154898 A1 | 6/2008 | Cheng |
| 2008/0167994 A1 | 7/2008 | Li et al. |
| 2008/0189188 A1 | 8/2008 | Morgenstern |
| 2008/0244038 A1 | 10/2008 | Martinez |
| 2008/0256592 A1 | 10/2008 | Schnell et al. |
| 2008/0313040 A1 | 12/2008 | Rose |
| 2009/0006225 A1 | 1/2009 | Multerer |
| 2009/0055288 A1 | 2/2009 | Nassimi |
| 2009/0083281 A1 | 3/2009 | Sarig et al. |
| 2009/0083541 A1 | 3/2009 | Levine |
| 2009/0234755 A1 | 9/2009 | Sidoruk |
| 2009/0327121 A1 | 12/2009 | Carroll et al. |
| 2010/0082489 A1 | 4/2010 | Lin et al. |
| 2010/0280879 A1 | 11/2010 | O'Sullivan et al. |
| 2010/0299151 A1 | 11/2010 | Soroka et al. |
| 2011/0016182 A1 | 1/2011 | Harris |
| 2011/0314560 A1 | 12/2011 | Harris |
| 2012/0330790 A1 | 12/2012 | Chatani |

FOREIGN PATENT DOCUMENTS

| | | |
|---|---|---|
| EP | 1 016 960 A1 | 7/2000 |
| JP | 9-244886 | 9/1997 |
| JP | 10-069511 | 3/1998 |
| JP | 10-133955 | 5/1998 |
| JP | 10-222428 | 8/1998 |
| JP | 11-143719 | 5/1999 |
| JP | 2000-020795 | 1/2000 |
| JP | 2000-227919 | 8/2000 |
| JP | 2000/298689 | 10/2000 |
| JP | 02001169246 | 6/2001 |
| KR | 1998-030143 | 7/1998 |
| KR | 1998-033266 | 7/1998 |
| KR | 2000/0060715 | 10/2000 |
| WO | WO 96/34356 | 10/1996 |
| WO | WO 00/63860 | 10/2000 |
| WO | WO 02/001333 | 1/2002 |
| WO | WO 2002/067095 | 8/2002 |
| WO | WO 2011/011030 | 1/2011 |

OTHER PUBLICATIONS xboxcom-xboxlive 052008.pdf, xbox.com/en-US/ pages from May 2008 retrieved from archive.org https://web.archive.org/web/20080428121505/http://www.xbox.com/en-US/live/memberships101.htm retrieved in Jan. 2016.*

Kuchera, Ben, "Nintendo's Wii Speak a new front in war against used games", Nov. 13, 2008 7:30pm, ARS technica, retrieved from http://arstechnica.com/gaming/2008/11/nintendos-wii-speak-a-new-front-in-war-against-used-games/ on Jan. 2, 2017 saved as (Nintendo Wii Speak a new front in war against used games.pdf).*

Stuart, Keith, "Michael Capps—Part Two 'Epic's president offers his views on retail vs digital distribution argument . . . '", Nov. 10, 2008 Gamesindustry.biz, retrieved from http://www.gamesindustry.biz/articles/michael-capps-part-two on Jan. 2, 2017 saved as (michael-capps-part-two.pdf).*

Bendel, Mike "Epic: Used Game Market is a huge issue, Publishers Exploring Ways to Combat", Nov. 10, 2008, https://www.exophase.com/8895/epic-used-game-market-is-a-huge-issue-publishers-exploring-ways-to-combat/.*

U.S. Appl. No. 13/529,669 Final Office Action dated Jan. 22, 2015.
U.S. Appl. No. 12/011,903 Office Action dated Jan. 6, 2015.

(56) References Cited

OTHER PUBLICATIONS

Merriam-Webster Online, Definition of "privilege", Apr. 25, 2009.
U.S. Appl. No. 13/220,157 Office Action dated Jul. 30, 2015.
PCT/US02/05422 International Search Report dated Sep. 12, 2002.
PCT/US10/00205 International Search Report and Written Opinion dated Mar. 12, 2010.
U.S. Appl. 09/894,793 Final Office Action dated Jan. 6, 2009.
U.S. Appl. No. 09/894,793 Final Office Action dated Nov. 20, 2007.
U.S. Appl. No. 09/894,793 Final Office Action dated Jan. 4, 2007.
U.S. Appl. No. 09/894,793 Office Action dated Aug. 7, 2006.
U.S. Appl. No. 09/894,793 Final Office Action dated Feb. 7, 2006.
U.S. Appl. No. 09/894,793 Office Action dated Aug. 23, 2005.
U.S. Appl. No. 09/894,793 Final Office Action dated Apr. 4, 2005.
U.S. Appl. No. 09/894,793 Office Action dated Aug. 18, 2004.
U.S. Appl. No. 13/529,669 Final Office Action dated Oct. 25, 2013.
U.S. Appl. No. 13/529,669 Office Action dated Mar. 28, 2013.
U.S. Appl. No. 12/011,903 Final Office Action dated Dec. 8, 2009.
U.S. Appl. No. 12/011,903 Office Action dated Mar. 30, 2009.
U.S. Appl. No. 12/506,076 Final Office Action dated Oct. 9, 2013.
U.S. Appl. No. 12/506,076 Office Action dated Oct. 5, 2012.
U.S. Appl. No. 12/220,157 Final Office Action dated Jun. 21, 2013.
U.S. Appl. No. 12/220,157 Office Action dated Mar. 6, 2013.
Berinstein, Paula; "DOI: A New identifier for digital content" (Jan. 1998): 72-77.
U.S. Appl. No. 12/011,903 Office Action dated Mar. 6, 2014.
U.S. Appl. No. 13/529,669 Final Office Action dated Jun. 23, 2014.
U.S. Appl. No. 12/011,903 Final Office Action dated Jun. 16, 2014.
U.S. Appl. No. 13/220,157 Office Action dated Aug. 7, 2014.
U.S. Appl. No. 13/220,157 Final Office Action dated Jun. 21, 2013.
U.S. Appl. No. 13/220,157 Office Action dated Mar. 6, 2013.
Bidwell, Percy W.; Imports in the American Economy, Foreign Affairs (pre-1986); Oct. 1945;24, ProQuest Central, pp. 85-98, total 14 pages.
Classified Ad 4—no title (May 29, 1852. New York Daily Times (1851-1857).
Digital Music Industry Leaders Line Up to Support iPin's E-Content Payment System PR Newswire [New York] Sep. 20, 1999: 1. Downloaded from ProQuestDirect on the Internet on Sep. 27, 2016, 4 pages.
Martin, Thomas; Ancient Greece: from prehistoric to Hellenistic Times, Yale University, 1996. pp. 11-12, total 2 pages.
U.S. Appl. No. 13/529,669 Office Action dated Nov. 18, 2016.
U.S. Appl. No. 12/011,903 Office Action dated Oct. 3, 2016.
U.S. Appl. No. 12/506,076 Office Action dated Jun. 17, 2016.
U.S. Appl. No. 12/506,076 Office Action dated Feb. 25, 2016.
U.S. Appl. No. 12/011,903 Office Action dated Apr. 14, 2017.

\* cited by examiner

REWARDING CLASSES OF PURCHASERS

BACKGROUND OF THE INVENTION

Field of the Invention

The present invention generally relates to the purchase of digital media. More specifically, the present invention relates to rewarding a classification of purchasers of digital media.

Description of the Related Art

Digital media encompasses a range of audio, video, video games, and other software applications. Digital media is typically sold or transferred via download over a communications network or on some form of digital storage media including optical discs such as a compact disc (CD) or digital versatile disc (DVD) as well as non volatile memory such as flash memory. Initial purchasers of digital media either through a download or on a storage medium are those individuals who buy the digital media new, unused, and directly from the publisher, manufacturer, or authorized retailer. Secondary purchasers of digital media are individuals who obtain (either permanently or temporarily by purchasing, borrowing, or renting) previously used or previously sold digital media from an initial purchaser, an intermediate secondary purchaser, or a reseller (e.g., GameStop), lender (e.g., a public library), or lessor of the media (e.g., GameFly). Rather than buy a new copy of a video game or other digital content on a corresponding digital storage medium (e.g., a DVD), a secondary purchaser buys, borrows, or rents a copy that has been previously owned and/or used. Because the digital media has been previously owned or has been used by any number of secondary purchasers when borrowed or rented, the price of an item of digital media on the secondary market is generally lower than those prices paid by initial purchasers.

Secondary purchasers—and parties that facilitate secondary purchases—also cause a significant financial loss to the publisher, manufacturer, and/or authorized retailer of initial copies of digital media. For example, a particular video game might cost $50 when purchased new. In a marketplace devoid of secondary purchasers or entities facilitating borrowing or renting of digital media, 100 individuals who might want to play this particular game would each buy a copy of the video game. Each of those individuals would become an initial purchaser of the digital media by purchasing a copy for $50. A single entity (or collection of entities) selling the digital media would, in turn, enjoy $5000 in sales.

In a marketplace with intermediate entities providing rentals of digital media, that intermediate entity might buy five copies of the particular videogame from an otherwise authorized seller of the digital media. Over time, the facilitating, intermediate entity might rent those five copies to all one hundred interested individuals at a cost of $10 for a month of playing time. While all 100 individuals may not be able to play the particular video game at the same time, each individual would ultimately engage in game play and at a significantly lesser cost—$10 for a month-long rental versus $50 for a single, long-term purchase. The entity that initially sold the digital media to the entity facilitating the secondary purchases or rentals would only enjoy sales of $250 (five copies at $50 apiece). The intermediate entity, however, would enjoy rental revenues of $1000 (100 rentals at $10 apiece), which would more than offset the initial purchase price of $250.

Potential buyers may be motivated to become an initial purchaser in order to obtain the digital media as soon as it becomes available, for the status of being an actual owner of the digital media, or because a secondary market may not be readily available or exist for a particular piece of digital media. Secondary purchasers, in contrast, are motivated by the lower purchase or rental prices offered by secondary markets. Secondary users may also only desire to have the digital media for a short period of time until they view a movie once or twice or 'beat' a particular game. Secondary purchasers may not desire to acquire a catalog of content or to re-watch or replay a particular movie or game over time. These considerations and the effects of the same-especially in light of the disparity in revenues to the publisher versus the intermediate reseller as noted above—become even more pronounced as the costs of producing content and digital media increase.

For example, the development cycle of a video game is extremely long, complex, and involves collaboration and investment from multiple individuals and businesses. The price of such a video game corresponds to the length and complexity of such a process as each entity in the development life cycle needs to receive appropriate remuneration for their time and effort. If parties are not properly compensated, then those parties will no longer participate in the development of video games or other forms of digital media. If certain entities discontinue their involvement in content development, then the availability of new content decreases as does the quality of the content that continues to be produced in order to minimize costs. A healthy initial purchaser population is therefore essential to recouping these investments of time and resources.

Notwithstanding the importance of an initial purchaser market, secondary markets are an important part of the distribution and development lifecycle. For example, secondary markets may be useful to publishers and authors because secondary markets may allow for promotion a particular title or series through word-of-mouth publicity or viral marketing. These grass-root efforts allow for sampling of lesser-known titles and publishers and build a future dedication to and interest in the same. In addition, secondary markets also allow for physical media to be recycled for use by multiple owners who might not otherwise make the investment in a particular game platform if there is a lack of available content at a moderate price.

Publishers, manufacturers, retailers, developers, performers, authors, and all other persons involved in the content development and distribution lifecycle, therefore, need to encourage potential buyers to become initial purchasers while preserving the benefits of the secondary market. These entities further need to encourage secondary purchasers to become initial purchasers for future—if not immediately available—digital media. There is a need for improved systems and methods for rewarding classifications of purchasers of digital media.

SUMMARY OF THE INVENTION

Embodiments of the present invention include rewarding a classification of purchasers of digital media. Such a classification may be based on whether an individual is an initial purchaser or a secondary purchaser of digital media. Digital devices are used to play the digital media. When a digital medium is played on a device, a notification is sent to a server. The server identifies a user of the digital device based on a unique device identifier associated with the digital device and a stored association between the identifier and the user. The digital medium is also associated with a unique identifier, which may be used to determine whether the identified user belongs to a particular classification.

Upon determining that the user is an initial purchaser, the user is provided with access to a reward that is not accessible to other classifications absent engaging in a further transaction. Users that are identified as not belonging to the first classification may be offered a chance to upgrade their classification and access the reward as a part of such a transaction.

An exemplary method for rewarding a classification of purchasers of digital media includes receiving a notification that a digital medium is being played on a digital device, identifying a user of the digital device based on matching a unique device identifier to the user, determining that the user belongs to the first classification of purchasers based on an evaluation of information related to a unique identifier associated with the digital medium, and providing the user with access to a reward based on the determination that the user belongs to the first classification of purchasers of the digital medium. The reward is not accessible to users belonging to a second classification of purchasers of the digital medium absent those users engaging in a further transaction.

A further claimed embodiment includes a computer-readable storage media for rewarding purchasers of digital media. Embodied on the storage medium is a program, the execution of which by a processor provides a method for rewarding purchasers of digital media in general accordance with that method previously set forth above.

DETAILED DESCRIPTION

Figure 1:
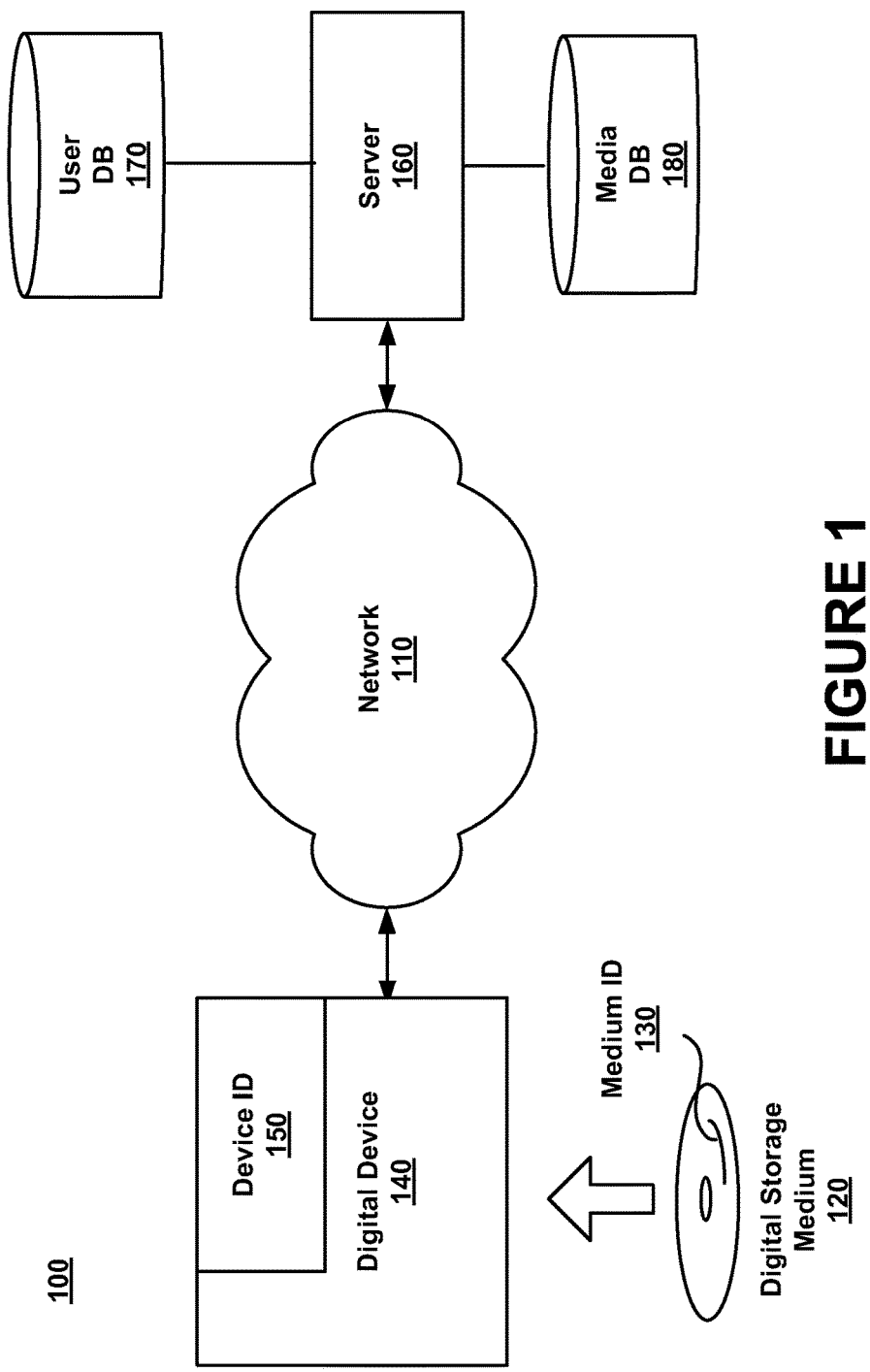
FIG. 1 illustrates an exemplary server-client environment where a digital device is in communication with a server via a communications network.

FIG. 1 illustrates an exemplary server-client environment 100 where a digital device 140 is in communication with a server 160 via a communications network 110. A digital storage medium 120 having a unique medium identifier 130 may be played on the digital device 140. The digital device 140 has a unique device identifier 150. The digital device 140 may communicate information regarding both the digital device 140 and the digital storage medium 120 to server 160 over communication network 110. The server 160 of FIG. 1 is in further communication with a user database 170 and a media database 180, which may be local or remote to the server 160. Server 160 can access stored data in both the user database 170 and the media database 180 and provide that data or information derived from or related to the same to digital device 140. Conversely, the server 160 may receive information from digital device 140 and store the same in user database 170 or media database 180 as is appropriate.

Network 110 may be a local, proprietary network (e.g., intranet) and/or may be a part of a larger wide-area network. The network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 110 allows for communication between the various components of server-client environment 100.

The digital storage medium 120 of FIG. 1 may include a media storage device such as a CD or DVD. Digital storage media 120 can store information and content that may be accessed and/or played on digital device 140. Digital storage media 120 may include portions of data or locked or 'secure' data whereby further information and/or interaction with server 160 may be required in order to unlock, access, or play that data. In some instances, the information or content may be downloaded over network 110. In such an instance, the content may be stored in memory at the digital device 140 or in some other form of portable memory. The downloaded content may still embody a unique identifier or other information to delineate one download from another (e.g., watermarks).

Each digital storage medium 120 is associated with a medium identifier 130 to uniquely identify the digital storage medium 120. The medium identifier 130 may be physically stamped on a CD-ROM, DVD-ROM, or associated documentation (thereby requiring manual entry of the information by a user), and/or be part of the information stored on the digital storage medium 120 and readable by the digital device 140. The medium identifier 130 may be assigned to the digital storage medium 120 by a manufacturer or publisher in the course of producing the digital storage medium 120. In the case of downloaded content, and as noted above, the identifier 130 may be a watermark embedded in or otherwise associated with the downloaded content file.

Digital device 140 of FIG. 1 is an electronic device, such as an electronic gaming system, a general-purpose computer, a set-top box, a Blu-Ray player, or a portable gaming device that may access the contents of the digital storage medium 120. The digital device 140 may also be configured to access data from other storage media, such as memory cards or disk drives as may be appropriate in the case of downloaded content.

Each digital device 140 is associated with a unique device identifier 150. During a use of the digital device 140, a user may register (either manually or through an automatic exchange of data over network 110) the digital device 140 (and device identifier 150) with the server 160. The digital device 140 may be registered and identified thereafter by reference to the device identifier 150, a corresponding user identifier, or both. The server 160 stores a device identifier 150, a corresponding user identifier (or identifiers), or both in the user database 170. A first-time user digital device 140 may be prompted by the server 160 to enter further user information, which may also be stored in user database 170. Either the device identifier 150 or a user identifier may be used to identify a particular user.

Information may be sent from the digital device 140 over the network 110 to the server 160 for storage in one or more databases, including the user database 170 and/or the media database 180. The server 160 can later access data stored in either the user database 170 or the media database 180 for various purposes including providing rewards to classifications of purchasers of content. Databases 170 and 180 are discussed in more detail in conjunction with FIGS. 2A-B.

Figure 2B:
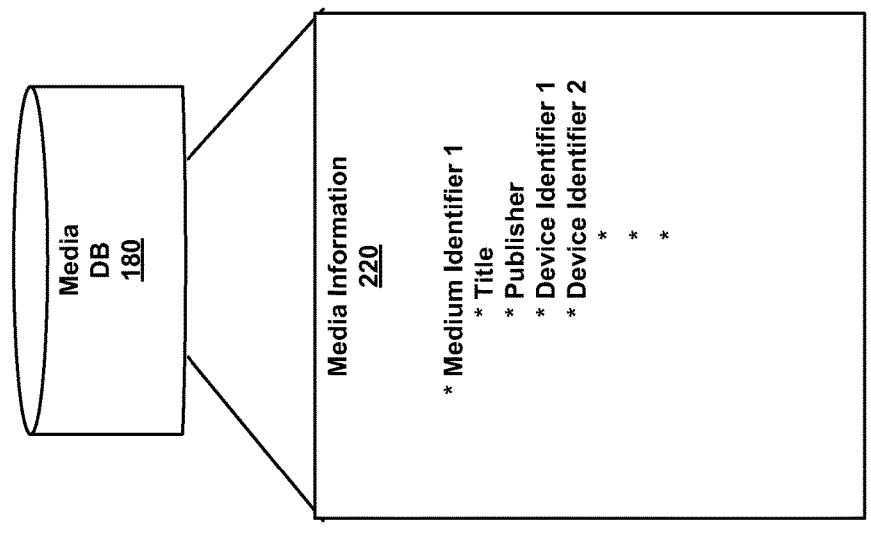
FIG. 2B illustrates a media database accessible to the server of FIG. 1.
Figure 2A:
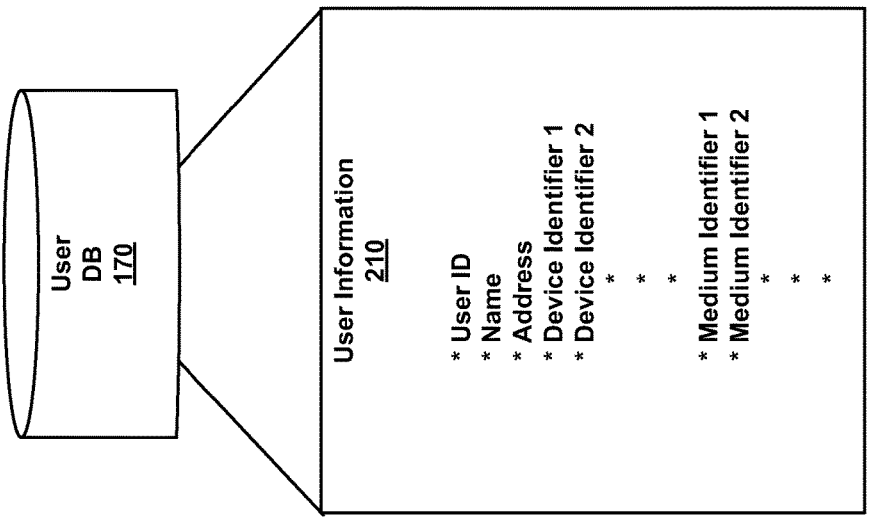
FIG. 2A illustrates a user database accessible to the server of FIG. 1.

FIG. 2A illustrates a user database 170 accessible to the server 160 of FIG. 1. The user database 170 includes user information 210 with respect to a plurality of users. Stored user information 210 may include name, user identifier, address, preferences, one or more device identifiers of digital devices associated with the user, and one or more media identifiers of media associated with the user or a device. The user database 170 may receive information and/or updates concerning users based on a user registration, registration of a new digital device 140, registration of a new digital storage medium 120 and corresponding medium identification 130, registration for a service, and requests for updates.

FIG. 2B illustrates a media database 180 accessible to the server 160 of FIG. 1. The media database 180 includes media information 220 concerning a plurality of digital storage media. Each digital storage medium 120 may be listed by media identifier 130. Information concerning a particular digital storage medium 120 may include title, publisher, and one or more digital devices 140 that have played the digital storage medium 120. The media database 180 may be populated with information from user registrations, from publishers, or a combination of the foregoing.

When a media identifier 130 is received by server 160, media database 180 and media information 220 are surveyed to determine whether the particular identifier 130 has previously been registered in the database 180. If the database 180 lacks media information 220 corresponding to that particular media identifier 130, then the system presumes that the corresponding digital storage medium 120 is newly purchased and is being registered for the first time The medium identifier 130 is also associated with the digital device 140 that played the digital storage medium 120 for the first time. A user associated with the digital device 140 is then characterized as an initial purchaser of the digital storage medium 120 and granted certain rewards as a further described below.

If the medium identifier 130 received from the digital device 140 has been previously registered in media database 180, then a determination is made as to whether the digital device 140 that is playing the corresponding digital storage medium 120 is that digital device 140 that initially registered the newly purchased digital storage medium 120. If the digital device 140 that is currently playing the digital storage medium 120 is the same digital device 140 that registered the digital storage medium 120, then it is presumed that the original/first purchaser of the digital storage medium 120 remains the original/first purchaser of that storage medium 120 and certain rewards that are granted to an initial purchaser remain available to that particular user.

If it is determined that a different digital device 140 is playing the storage medium 120, the server 160 may instantiate a query operation to the digital device 140. Through this query, the server 160 may notify the digital device 140 as a user currently operating the same the device identifier 150 as it corresponds to that particular digital device 140 does not match the device identifier 150 as it pertains to the medium identification 130 previously stored in database 180. The operator of the disparate digital device 140 may be requested to provide user information as the user database 170 maintains information pertaining to devices, users, and certain media as described above. In some instances, an original owner of content may have simply taken the content to another location to engage in game play or to view a movie (e.g., to a friend's house, that friend having their own digital device 140). If the user of the digital device 140 is able to provide user identification that corresponds to the medium identifier 130 notwithstanding the disparity in device identifier 150, then the rewards may continue to be granted.

In many instances, however, the reason for the disparity between device identifier 150 and medium identification 130 is that the original and first owner of the digital storage medium 120 is no longer the owner of the medium 120 and has sold the same to a new user. If the current owner/user of the digital storage medium 120 is unable to provide the correct corresponding user identification or expressly indicates that they are a secondary owner of the digital storage medium 120, then records at the user database 170 and media database 180 are updated to reflect, at the very least, that digital storage medium 120 corresponding to a particular medium identifier 130 should now be considered secondary media and that rewards that are normally granted to an original or initial purchaser of the medium 120 should no longer automatically attach. The new owner may be able to acquire those rewards, but only after purchasing those rights or upgrading to a higher classification of owner.

In some instances, a purchaser or seller of the digital storage medium 120 might preemptively update user information 210 and media information 220. Information may be updated directly from a digital media device 140 or through a secondary interface such as a web-based browser on a computer. Certain updates to user and media information (210/220) may also be made at the initial point of sale as a part of the sales transaction. A user may also update a record to indicate that while they remain the original owner that they have since acquired a new digital device 140 that should be associated with the user identification or replace a preexisting device identifier 150.

Figure 3:
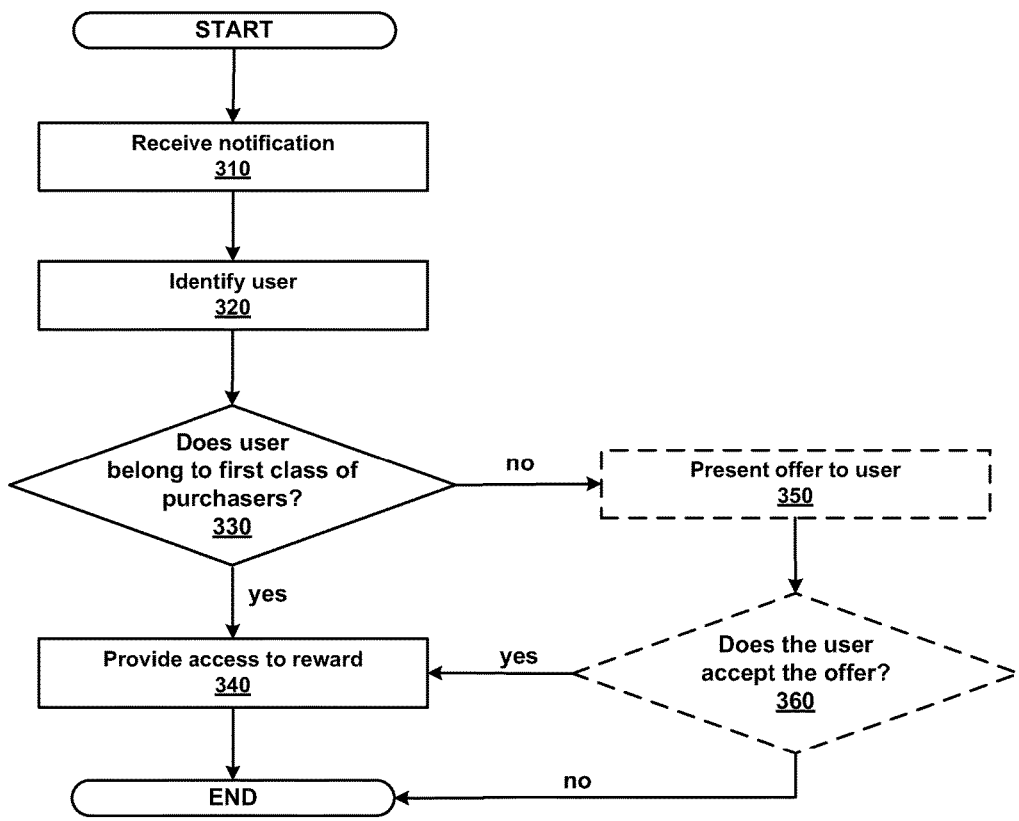
FIG. 3 is a flowchart illustrating an exemplary method for rewarding a classification of purchasers of digital media.

FIG. 3 is a flowchart illustrating an exemplary method 300 for rewarding a first classification of purchasers of digital media. The method 300 of FIG. 3 further provides incentives for other classifications to convert to the first classification. The method 300 of FIG. 3 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 as illustrated in FIG. 3, a digital medium (digital medium 120) is played on a digital device (digital device 140), triggering delivery of a notification to server or other computing device (server 160) over a communications network (network 110). The notification may include information concerning the user, digital device, and digital medium, each of which may be associated with unique identifiers. Based on information in the notification, a user is identified. A determination is then made as to whether the user belongs to a particular classification of purchasers of the digital medium (e.g., an initial purchaser of new media). If the user belongs to the particular class, the user is provided with access to a reward. If the user does not belong to the particular class, the user may be offered an upgrade so that the user may join that class and receive access to the reward.

In step 310, a notification is received at a server or other computing device tasked with determining whether a user belongs to a particular class of purchaser. The notification concerns play of a digital medium 120 with media identifier 130 on a digital device 140 with device identifier 150. When play of digital media 120 is detected at digital device 140, a notification may be generated concerning the detection event, including the details of the digital media 120 and digital device 140.

A user of the digital device 140 is identified in step 320 following receipt of the notification of step 310. Using the notification information received in step 310, the server 160 may formulate a search based on identifying the user of digital device 140. Specifically, the server 160 may search the user database 170 for the unique device identifier 150 of the digital device 140. The device identifier 150 may be found, for example, in user information 210 associated with a particular user.

Based on the user information 210 of the identified user, it is then determined whether the user belongs to a particular classification of purchasers of the digital medium 120. In an exemplary embodiment, it is determined whether the user is an initial purchaser of a new, unused copy of the digital medium 120. Such a determination may be made based on an evaluation of information related to the unique medium identifier 130 of the digital medium 120. For example, user information 210 may indicate that a user is an initial or secondary purchaser of digital medium 120. Media information 220 may also be searched for indication that the digital medium 120 has been played on a certain number of digital devices 140, which may be associated with one or more users. Such information may be used to determine whether a particular user belongs to the first classification of purchasers.

If the user is determined to belong to the first classification of purchasers, the user is provided with access to a reward in step 340. Such a reward is not generally accessible to users who belong to other classifications. Rewards may include improved audio-visual quality in the play of the digital medium on the digital device, wherein the level of audio-visual quality is superior to a level of audio-visual quality available to users belonging to a second or different classification. The reward may also include the ability to receive or be associated with a digital trophy related to game play or certain achievements therein. The digital trophy may, in some instances, be portable to other digital media whereby the user may receive a trophy in one game genre and be associated with that trophy in another genre.

The reward may alternatively or further include the ability to customize play of or interaction with the digital medium. For example, a user may be able to design or change aspects of different levels of game play. Changes may also be decorative and include skinning or allow for the introduction of particular visual interfaces or other overlays. Customization may also apply to introduction of sound effects and/or the ability to introduce certain sound effects in response to occurrence of certain events or at certain points of play of the digital medium. Customization may also include the ability to configure a control device associated with interacting with the content. For example, a user may not desire to play a game using a default controller configuration. A customization reward may allow a user to reconfigure how a particular button or other interaction input on a control device results in a change or reaction with respect to the digital medium (e.g., movement of a character).

Other rewards might include additional or enhanced abilities for a character in a video game. For example, a game character might enjoy enhanced strength or stamina or receive certain powers not otherwise available to that character. Such enhancements or abilities might be specific to a character associated with the rewarded user or might apply to a family of characters associated with the user or other characters that belong to a team or clan associated with the rewarded user.

Other rewards include additional modes of game play or tutorials related to game play whereby a user may receive instructions as to certain maneuvers or in-game interactions. A user might also be rewarded with an additional save point for a video game whereby the save point allows game play information to be saved at a designated moment in game play. As a result, the user is able to restart or 'backup' to the information at the save point rather than start over from the beginning of game play or an earlier save point that might not reflect certain efforts or accomplishments achieved since that prior save point.

A reward might also include related literature or media or other information about the game or media. Such information might include previews or exclusive news or other information concerning upgrades and future releases. Rewards may also encompass discounts on related purchases either in the game or in the real world and associated with the game or media (e.g., a discount on a second movie in a series or the next release in a video game franchise). Rewards might also include redeemable points that may be used to acquire various prizes or objects in the game or in the real world.

Based on the digital medium 120, the amount and type of rewards available may vary. Further, new rewards may become available over time. The reward may be provided through downloading content from server 160 to client device 140. In some cases, the content of the reward may already be stored on digital medium 120, but inaccessible until the determination was made in step 330 that the user belongs to a particular classification.

If the user is determined to belong to another classification of purchasers, the user may be presented with an offer to join the first classification in step 350. The offer may require a payment or registration for acceptance. The incentive for accepting such an offer is access to the rewards that are provided to users of the first classification. Such an offer may encourage secondary purchasers to convert their status, so that they belong to the first classification and are afforded the benefits and rewards of being classified as such.

In step 360, it is determined whether the user accepts the offer presented in the step 350. Acceptance, as noted above, may include a payment or providing additional registration information. Upon an indication of acceptance from the user, server 160 may then initiate the processing of payment or query the user for information. Once the payment and/or registration is completed, the user may then be assigned to the first classification and, as such, be provided with access to the rewards described with respect to step 340.

While the foregoing system and methodology has been described with respect to incentivizing a user to upgrade or make an initial new purchase of media, the present systems and methods may also be used to offer disincentives to the purchase or use of secondary media. The foregoing rewards, instead of being true rewards or additional rights or benefits granted to a user may, in fact, be a standard component, right, ability or other aspect of game play. Upon a determination that a user does not belong to a particular class of game play (e.g., a secondary purchaser or renter of media), those rights or benefits might be taken away. This may be accomplished by server 160 sending a signal or other information to digital device 140 that causes the digital medium 120 to be processed in such a way that those rights and benefits are not enabled or are otherwise "blocked."

Upon upgrading or providing other registration information, the "block" may be removed and the rights (rewards) may be restored.

The present invention may be implemented in an application that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for rewarding a classification of purchaser, the method comprising:
    storing a plurality of classifications in memory of a server, each of the stored classifications corresponding to a set of classification elements;
    receiving a notification regarding a detected play of a digital media by a purchaser on a digital device, wherein the notification includes a unique user identifier, a unique media identifier embedded in a digital storage medium associated with the digital media, and a unique device identifier associated with the purchaser, and wherein the notification is received at the server;
    executing instructions stored in memory at the server, wherein execution of the instructions by a processor at the server:
        identifies the purchaser and the digital device used to play the digital media via the unique user identifier and the unique device identifier included in the received notification,
        matches the unique media identifier to stored information associated with the digital media, the stored information indicating whether the digital media has been played on other digital devices or used by other users,
        identifies that the digital media is new and unused at a time of the detected play of the digital media based on no matches between the unique media identifier and the stored information,
        generates an association between the digital media and the unique user identifier and unique device identifier, the association being stored in memory at the server,
        updates the stored information associated with the digital media, the updated stored information indicating that the digital media has been played on the digital device associated with the unique device identifier, and
        classifies the purchaser in accordance with at least a first one of the stored classifications with respect to the digital media, wherein the first classification characterizes a set of purchasers, wherein a set of classification elements corresponding to the first classification is based on identifying that the identified purchaser is using the digital media under a pre-determined condition specifying that the digital media is new and unused, wherein the classification is stored in memory at the server,
    unlocking access to secured data associated with the digital media based on the classification that the purchaser belongs to the first classification of purchasers, wherein the secured data is not accessible to purchasers not within the first classification without engaging in an additional transaction; and
    automatically attaching rights over the secured data to the unique user identifier based on the unlocked access.

2. The method of claim 1, wherein the pre-determined condition also includes purchasing the digital media from a seller belonging to a specified classification of sellers.

3. The method of claim 1, wherein the secured data allows an ability to receive or be associated with one or more redeemable points.

4. The method of claim 3, wherein the redeemable points are associated with the purchaser and portable across a plurality of digital media.

5. The method of claim 1, wherein the secured data allows for enhancement of play of or interaction with the digital media.

6. The method of claim 5, wherein the enhancement applies to a customizable decorative feature of a character or digital environment, the decorative feature to be rendered during play of the digital media.

7. The method of claim 5, wherein the enhancement applies to a customizable sound effect, the sound effect to be played at a moment designated by the purchaser during play of the digital media.

8. The method of claim 5, wherein the enhancement applies to a customizable configuration of the digital device for interacting with the content of the digital media.

9. The method of claim 5, wherein the digital media includes a video game and the enhancement includes a new or improved ability exercised by a character in the video game and associated with the purchaser.

10. The method of claim 9, wherein the ability may be shared with a team of characters associated with the character associated with the user in the video game.

11. The method of claim 4, wherein the redeemable points are redeemable to acquire a virtual object to be associated with the purchaser during play of or interaction with the digital media.

12. The method of claim 3, wherein the redeemable points are redeemable to acquire a real object.

13. The method of claim 1, wherein the digital media includes a video game and the secured data allows for introduction of an additional save point to the video game, the save point allowing game play information to be saved at a designated moment in game play whereby the purchaser is able to restart game play based on the game play information saved at the save point.

14. The method of claim 1, wherein the notification includes information provided by a seller.

15. The method of claim 1, wherein the notification includes information provided by the purchaser.

16. The method of claim 1, wherein the secured data includes a discount applicable to a future purchase of a real or virtual object available for sale.

17. The method of claim 1, wherein the secured data is stored in memory at the server, and wherein further access to the secured data by the purchaser is based on the rights attached to the unique user identifier.

18. The method of claim 1, wherein the secured data is downloaded to the digital device based on the rights attached to the unique user identifier.

19. The method of claim 1, wherein the secured data is only available to a second purchaser belonging to a second classification of purchasers when the second purchaser completes the additional transaction, wherein the additional transaction is a financial transaction, wherein the digital media were previously used at a time of detected play by the second purchaser.

20. The method of claim 1, further comprising determining that a second purchaser belongs to a second classification and generating an offer to the second purchaser, the offer concerning the additional transaction and access to the secured data.

21. A non-transitory computer-readable storage medium, having embodied thereon a program, the program being executable by a processor to perform a method for rewarding a classification of purchasers, the method comprising:

storing a plurality of classifications in memory of a server, each of the stored classifications corresponding to a set of classification elements;

receiving a notification regarding a detected play of a digital media by a purchaser on a digital device, wherein the notification includes a unique user identifier, a unique media identifier embedded in a digital storage medium associated with the digital media, and a unique device identifier, and wherein the notification is received at the server;

identifying the purchaser and the digital device used to play the digital media via the unique user identifier and the unique device identifier included in the received notification;

matching the unique media identifier to stored information associated with the digital media, the stored information indicating whether the digital media has been played on other digital devices or used by other users;

identifying that the digital media is new and unused at a time of the detected play of the digital media based on no matches between the unique media identifier and the stored information;

generating an association between the digital media and the unique user identifier and unique device identifier, the association being stored in memory at the server;

updating the stored information associated with the digital media, the updated stored information indicating that the digital media has been played on the digital device associated with the unique device identifier;

classifying the purchaser in accordance with at least a first one of the stored classifications with respect to the digital media, wherein the first classification characterizes a set of purchasers, wherein a set of classification elements corresponding to the first classification is based on identifying that the identified purchaser is using the digital media under a pre-determined condition specifying that the digital media is new and unused, wherein the classification is stored in memory at the server;

unlocking access to secured data associated with the digital media based on the classification that the purchaser belongs to the first classification, wherein the secured data is not accessible to purchasers not within the first classification without engaging in an additional transaction; and automatically attaching rights over the secured data to the unique user identifier based on the unlocked access.

\* \* \* \* \*